(12) United States Patent
Miles

(10) Patent No.: US 9,694,877 B2
(45) Date of Patent: Jul. 4, 2017

(54) TIE DOWN SYSTEM

(71) Applicant: Kevin J. Miles, Medford, OR (US)

(72) Inventor: Kevin J. Miles, Medford, OR (US)

( * ) Notice: Subject to any disclaimer, the term of this patent is extended or adjusted under 35 U.S.C. 154(b) by 0 days.

(21) Appl. No.: 15/235,149

(22) Filed: Aug. 12, 2016

(65) Prior Publication Data

US 2016/0347418 A1  Dec. 1, 2016

Related U.S. Application Data

(62) Division of application No. 13/757,758, filed on Feb. 2, 2013, now Pat. No. 9,433,261.

(51) Int. Cl.
| | |
|---|---|
| *B63B 17/02* | (2006.01) |
| *B60P 7/08* | (2006.01) |
| *A44B 13/00* | (2006.01) |
| *B60P 7/00* | (2006.01) |
| *F16B 45/00* | (2006.01) |

(52) U.S. Cl.
CPC .......... *B63B 17/02* (2013.01); *A44B 13/0029* (2013.01); *B60P 7/00* (2013.01); *B60P 7/0823* (2013.01); *F16B 45/00* (2013.01)

(58) Field of Classification Search
CPC .......... B63B 17/02; B60P 7/0823; B60P 7/00; F16B 45/00; A44B 13/0029; Y10T 24/3916
USPC ................ 24/265 H, 300, 301, 302
See application file for complete search history.

(56) References Cited

U.S. PATENT DOCUMENTS

| | | | | |
|---|---|---|---|---|
| 115,826 | A * | 6/1871 | Creed ................. | B63H 9/0657 114/115 |
| 283,719 | A * | 8/1883 | Mosher ................ | F16G 11/00 16/202 |
| 307,219 | A * | 10/1884 | Palmer ................. | F16G 11/00 24/129 R |
| 329,071 | A * | 10/1885 | Palmer ................. | F16G 11/00 135/119 |
| 332,271 | A * | 12/1885 | Michaelis ............ | B68B 1/02 24/129 B |
| 377,063 | A * | 1/1888 | Chambard ........... | A01D 87/00 212/88 |
| 551,836 | A * | 12/1895 | Provan ................. | B66C 1/12 24/129 B |
| D34,114 | S | 2/1901 | Stagg et al. | |
| 987,407 | A * | 3/1911 | Scott ..................... | B65D 63/10 24/129 R |
| 1,407,406 | A * | 2/1922 | Glazebrook ......... | B66C 1/12 24/129 R |
| 2,092,239 | A * | 9/1937 | Bergloff ............... | F16G 11/14 24/129 R |
| D132,017 | S | 4/1942 | Arnstein | |
| 2,322,576 | A | 6/1943 | Huebshman | |
| 2,372,967 | A | 4/1945 | Martin | |
| 3,348,273 | A | 10/1967 | Clarence | |
| D234,946 | S | 4/1975 | Fredriksson et al. | |

(Continued)

*Primary Examiner* — Robert J Sandy
*Assistant Examiner* — Rowland Do
(74) *Attorney, Agent, or Firm* — Jerry Haynes Law

(57) ABSTRACT

A tie down system includes at least one device hook having a hook base; at least one hook opening in the hook base; a generally elongated hook shaft extending from the hook base; a curved hook finger extending from the hook shaft; a hook base extension extending from the hook base in spaced-apart relationship to the hook shaft; and a hook slot between the hook shaft and the hook base extension.

11 Claims, 5 Drawing Sheets

(56) References Cited

U.S. PATENT DOCUMENTS

| | | | |
|---|---|---|---|
| 3,930,288 A * | 1/1976 | Black | B66C 1/12 |
| | | | 24/129 R |
| 4,007,808 A * | 2/1977 | Conley | B63C 5/02 |
| | | | 182/142 |
| 4,034,443 A * | 7/1977 | Turner | F16G 11/14 |
| | | | 24/129 B |
| 4,105,349 A * | 8/1978 | Kupperman | F16G 11/14 |
| | | | 24/129 R |
| D266,374 S | 10/1982 | Drake | |
| 4,831,692 A | 5/1989 | Chuan | |
| 5,317,788 A | 6/1994 | Esposito et al. | |
| 5,366,327 A | 11/1994 | Nelson | |
| 5,385,435 A | 1/1995 | Musta | |
| D373,526 S | 9/1996 | Roethler | |
| 5,651,633 A | 7/1997 | Howe | |
| D389,728 S | 1/1998 | Fitzwater | |
| D412,100 S | 7/1999 | Kruse et al. | |
| 6,094,784 A | 8/2000 | Schrader | |
| 6,292,984 B1 | 9/2001 | Nelson | |
| 6,308,383 B1 | 10/2001 | Schrader | |
| D478,805 S | 8/2003 | Winig et al. | |
| 6,772,929 B1 | 8/2004 | Stein | |
| D524,636 S | 7/2006 | Burnett | |
| 7,214,014 B2 | 5/2007 | Stanley | |
| 7,306,417 B2 | 12/2007 | Dorstewitz | |
| D646,151 S | 10/2011 | Potts et al. | |
| D661,175 S | 6/2012 | Dahl et al. | |
| 8,272,108 B2 | 9/2012 | Langtry et al. | |
| D694,613 S | 12/2013 | Miles | |
| 2011/0146558 A1 | 6/2011 | Koreli et al. | |
| 2015/0176678 A1* | 6/2015 | Burrell | F16G 11/14 |
| | | | 24/129 R |

* cited by examiner

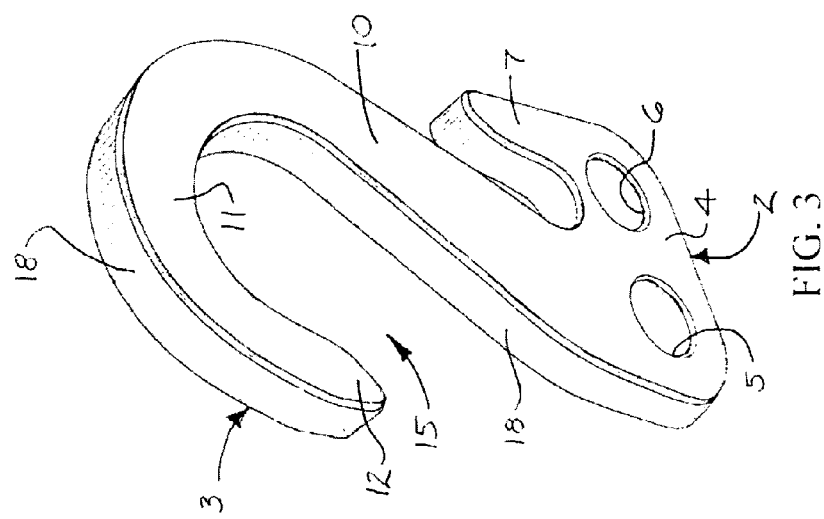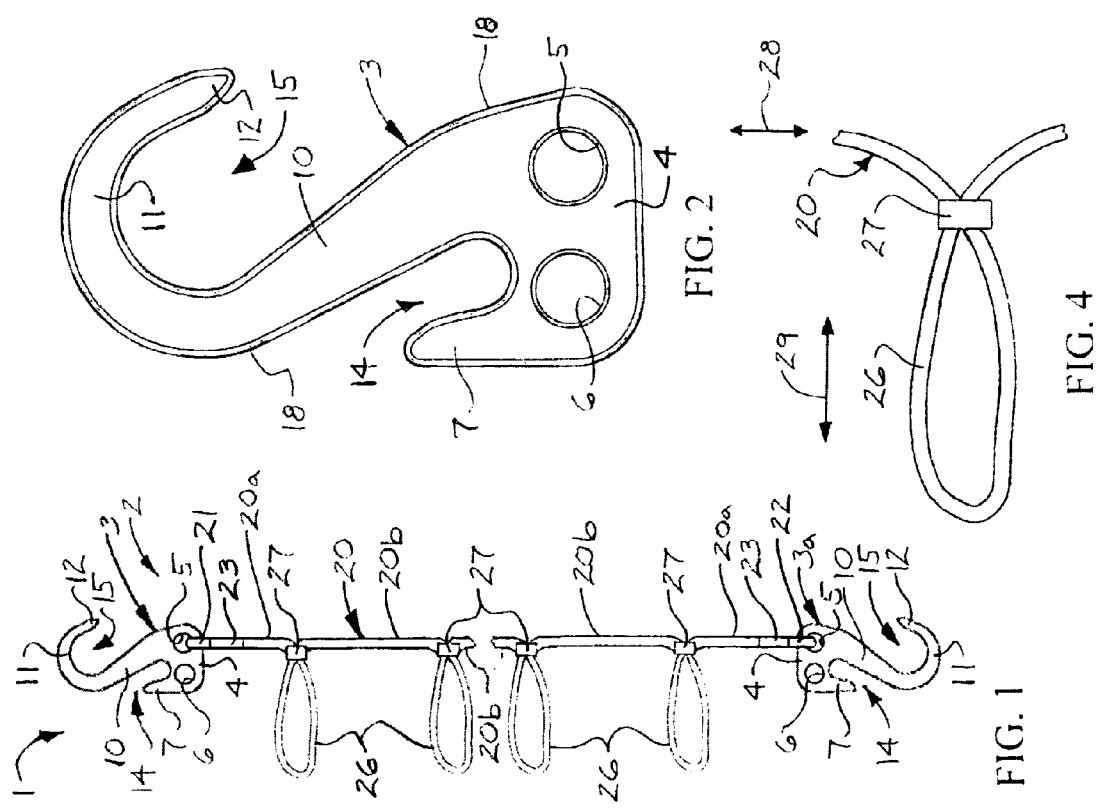

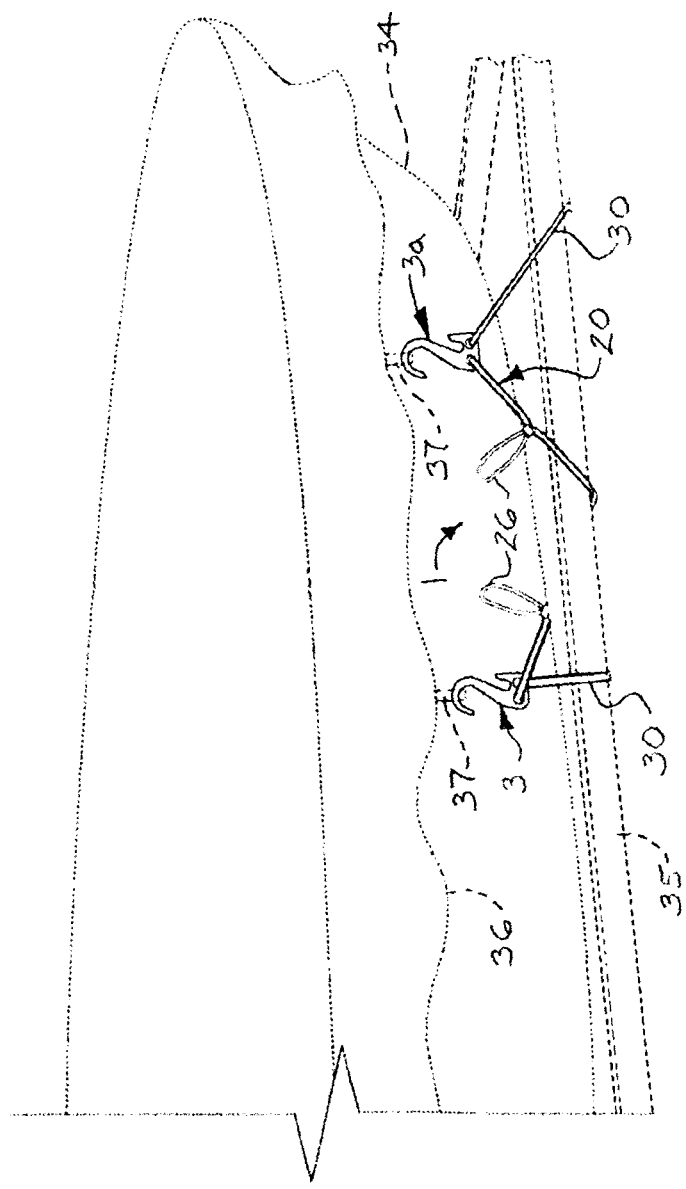

TIE DOWN SYSTEM

CROSS-REFERENCE TO RELATED APPLICATION(S)

This application claims the benefit of and is a divisional application of U.S. non-provisional application Ser. No. 13/357,758, filed Feb. 2, 2013 and entitled "TIE DOWN SYSTEM", which non-provisional application is incorporated by reference herein in its entirety.

FIELD OF THE INVENTION

Illustrative embodiments of the disclosure generally relate to devices for securing objects. More particularly, illustrative embodiments of the disclosure relate to a tie down system which is easily adjustable in size and versatile for a variety of applications.

BACKGROUND OF THE INVENTION

Various techniques are known for securing objects on a transport vehicle or a tarp or cover on an object such as a boat, for example, such as for the purpose of transporting the object. One of the most common methods for securing an object includes tying ropes to attachment points on the transport vehicle and attaching the ropes to the object or tightening the ropes against the object. Bungee cords or the like may be attached to the ropes and to attachment points on the transport vehicle to additionally secure the object on the vehicle. In some applications, tie-down straps fitted with ratchet mechanisms adapted to tighten the straps may be used to secure the object to the vehicle.

One of the drawbacks of using conventional ropes and bungee cords to secure an object on a transport vehicle is that the ropes must be tied securely to prevent the ropes from inadvertently becoming detached during transport. Therefore, proper securing of the object on the vehicle may require knowledge of how to correctly tie the knots in the ropes to prevent the ropes from inadvertently becoming untied. Furthermore, the bungee cords may not be securely attached to the ropes since the ropes typically lack suitable attachment points for the bungee cords between the ends of the ropes. Moreover, the ratchet mechanisms on many tie-down straps may be complicated and difficult to operate.

Accordingly, a tie down system which is easily adjustable in size and versatile for a variety of applications may be desirable for some applications.

SUMMARY OF THE INVENTION

Illustrative embodiments of the disclosure are generally directed to a tie down system. An illustrative embodiment of the tie down system includes at least one device hook including a hook base, at least one hook opening in the hook base, a generally elongated hook shaft extending from the hook base, a curved hook finger extending from the hook shaft, a hook base extension extending from the hook base in spaced-apart relationship to the hook shaft and a hook slot between the hook shaft and the hook base extension.

In some embodiments, the tie down system may include a tie down device having a device strap; first and second device hooks terminating respective ends of the device strap; and at least one intermediate strap loop extending from one side of the device strap between the first and second device hooks.

BRIEF DESCRIPTION OF THE DRAWINGS

Illustrative embodiments of the disclosure will now be described, by way of example, with reference to the accompanying drawings, in which:

FIG. 1 is a side view of an illustrative tie down device embodiment of a tie down system;

FIG. 2 is a side view of an exemplary device hook of the tie down device embodiment of the tie down system illustrated in FIG. 1;

FIG. 3 is a perspective view of the exemplary device hook illustrated in FIG. 2;

FIG. 4 is a side view, partially in section, of an exemplary intermediate strap loop of the tie down device embodiment of the tie down system;

FIG. 5 is a side view, partially in section, of a boat supported on a boat trailer and a boat cover (each illustrated in phantom) on the boat, with the exemplary tie down device embodiment of the tie down system securing the boat cover on the boat;

DETAILED DESCRIPTION

Figure 6:
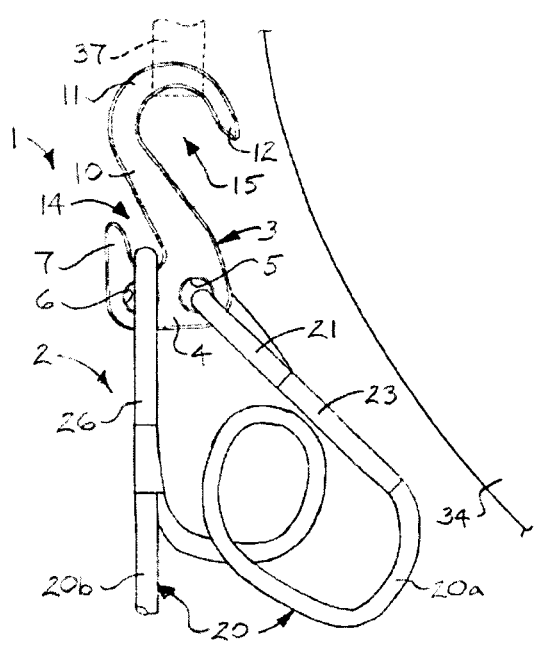
FIG. 6 is a side view, partially in section, of the exemplary tie down device embodiment deployed in a shortened configuration in exemplary application of the tie down system.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. Relative terms herein, such as "upper", "lower", "front" and "rear", are used with reference to relative positions of various elements with respect to each other in exemplary application of the fish scaling assembly and are not intended to be used in a limiting sense.

Referring initially to FIGS. 1-4 of the drawings, an illustrative embodiment of a tie down system, hereinafter system, is generally indicated by reference numeral 1. The system 1 may include a tie down device 2. The tie down device 2 may include an elongated, flexible device strap 20. In some embodiments, the device strap 20 may include braided or non-braided nylon, polypropylene and/or other suitable tough, durable and non-elastic material. In other embodiments, the device strap 20 may include a stretchable material such as a bungee cord, for example and without limitation.

A first device hook 3 and a second device hook 3*a* terminate opposite ends of the device strap 20. The first device hook 3 and the second device hook 3*a* may each include a hook base 4. The hook base 4 of each of the first device hook 3 and the second device hook 3*a* may be attached to the device strap 20 in a manner which will be hereinafter described. A primary hook opening 5 and a secondary hook opening 6 may extend through the hook base 4 in generally adjacent relationship to each other. A hook base extension 7 may extend from the hook base 4.

An elongated hook shaft 10 extends from the hook base 4. A curved hook finger 11 extends from the hook shaft 10. The hook finger 11 terminates in a hook terminus 12 which may be tapered, as illustrated in FIG. 2. A hook opening 15 is formed by the hook shaft 10, the hook finger 11 and the hook terminus 12. The hook shaft 10 may be disposed in adjacent and spaced-apart relationship to the hook base extension 7. A hook slot 14 may be formed between the hook base extension 7 and the hook shaft 10. In some embodiments, the hook base 4, the hook base extension 7, the hook shaft 10, the hook finger 11 and the hook terminus 12 may be bound by a flat or planar and continuous hook perimeter surface 18. The first device hook 3 and the second device hook 3*a* may each be metal, plastic, carbon fiber composite and/or other material which is consistent with the functional requirements of the tie down device 2.

The first device hook 3 and the second device hook 3*a* may be attached to the device strap 20 using any suitable attachment technique which is known by those skilled in the art and suitable for the purpose. In some embodiments, opposite ends of the device strap 20 may terminate in a first strap end loop 21 and a second strap end loop 22, respectively. Each of the first strap end loop 21 and the second strap end loop 22 may be secured using a loop stay 23. The first strap end loop 21 may extend through the primary hook opening 5 in the hook base 4 of the first device hook 3. The second strap end loop 22 may extend through the primary hook opening 5 in the hook base 4 of the second device hook 3*a*.

At least one intermediate strap loop 26 extends from the device strap 20 between the first strap end loop 21 and the second strap end loop 22. In some embodiments, multiple intermediate strap loops 26 may extend from the device strap 20 at spaced-apart intervals. For example and without limitation, in some embodiments, the intermediate strap loops 26 may be provided on the device strap 20 at spaced-apart intervals of about 12 inches with respect to each other. A primary strap segment 20*a* may extend between the first device hook 3 and the next succeeding intermediate strap loop 26 and between the second device hook 3 and the next succeeding intermediate strap loop 26, respectively, on the device strap 20. A secondary strap segment 20*b* may extend between each pair of adjacent intermediate strap loops 26. As illustrated in FIG. 4, each intermediate strap loop 20 may have a longitudinal axis 29 which is oriented in generally perpendicular relationship to a longitudinal axis 28 of the device strap 20.

Each intermediate strap loop 26 may be attached to the device strap 20 according to any suitable attachment technique which is known by those skilled in the art and which is consistent with the functional requirements of the tie down device 2. For example and without limitation, as illustrated in FIG. 4, in some embodiments, each intermediate strap loop 26 may be formed as a looped extension of the device strap 20 and secured using a loop stay 27 or the like. In other embodiments, the device strap 20 and the intermediate strap loops 26 may be formed as separate components. Each intermediate strap loop 26 may be attached to the device strap 20 via sewing, mechanical fasteners and/or other suitable attachment technique.

Referring next to FIG. 5 of the drawings, in exemplary application, the tie down device 2 of the tie down system 1 may be used to secure a boat cover 36 on a boat 34 which may be supported by a boat trailer 35. The boat cover 36 may be standard or conventional and may include multiple boat cover straps 37 which extend from the perimeter of the boat cover 36 in spaced-apart relationship to each other. Accordingly, the first device hook 3 of the tie down device 2 may be attached to a first boat cover strap 37 on the boat cover 36 by extending the hook finger 11 of the first device hook 3 through the first boat cover strap 37. The device strap 20 may be extended downwardly around the lower surface of the boat trailer 35 and then pulled upwardly and the second device hook 3*a* attached to a second boat cover strap 37 on the boat cover 36. Additional tie down devices 2 may be used to secure the remaining pairs of boat cover straps 37 to the boat trailer 35 in a similar manner around the perimeter of the boat cover 36. Therefore, the tie down devices 2 retain the boat cover 36 on the boat 34 in a secure manner for covered storage and/or transport of the boat 34 on the trailer 35. The tie down devices 1 may be removed from the boat cover 36 by disengaging the first device hook 3 and the second device hook 3*a* of each tie down device 1 from the respective boat cover straps 37.

In some applications, a tie down strap 30 may be used to attach each pair of adjacent tie down devices 2 to each other. Accordingly, a first end (not illustrated) of the tie down strap 30 may be threaded through the secondary hook opening 6 in each of the first device hook 3 and the second device hook 3*a* and tied or otherwise secured to prevent the tie down strap 30 from pulling through the secondary hook opening 6. The free second end (not illustrated) of the tie down strap 30 may be extended beneath the boat trailer 35 and likewise threaded through and secured in the secondary hook opening 6 in the first device hook 3 or the second device hook 3*a* of the adjacent tie down device 2.

Referring next to FIG. 6 of the drawings, it will be appreciated by those skilled in the art that the length of the device strap 20 can be selectively shortened as deemed necessary depending on the particular application of the tie down device 2. For example, in some applications it may be necessary or desirable to reduce the length of the device strap 20 of one or more of the tie down devices 2 in order to achieve a secure and snug fit of the boat cover 36 on the boat 34. Accordingly, the first device hook 3 and the second device hook 3*a* of the tie down device 2 may initially be attached to the respective boat cover straps 37 on the boat cover 36 as was heretofore described with respect to FIG. 5, with the device strap 20 extending beneath the boat trailer 35. One of the intermediate strap loops 26 is then pulled upwardly and inserted in the hook slot 14 between the hook base extension 7 and the hook shaft 10 of the first device hook 3 and/or the second device hook 3*a*. This action shortens and tensions the device strap 20 and slackens the primary strap segment 20a between the first strap end loop 21 and the next succeeding intermediate strap loop 26 along the device strap 20.

Figure 7:
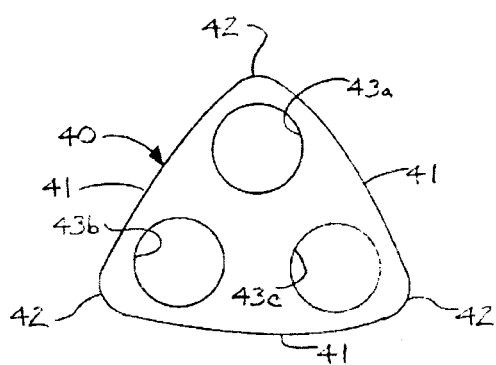
FIG. 7 is a front view of an exemplary rope lock element of an illustrative embodiment of the tie down system.

Referring next to FIG. 7 of the drawings, in some embodiments, the tie down system 1 may include a strap lock 40. The strap lock 40 may be generally triangular with three rope lock sides 41 and three rope lock corners 42. First, second and third strap openings 43a-43c, respectively, may extend through the strap lock 40 generally at the respective rope lock corners 42. The strap lock 40 may be metal, plastic, carbon fiber composite and/or other material which is consistent with the functional requirements of the tie down device 1.

Figure 8:
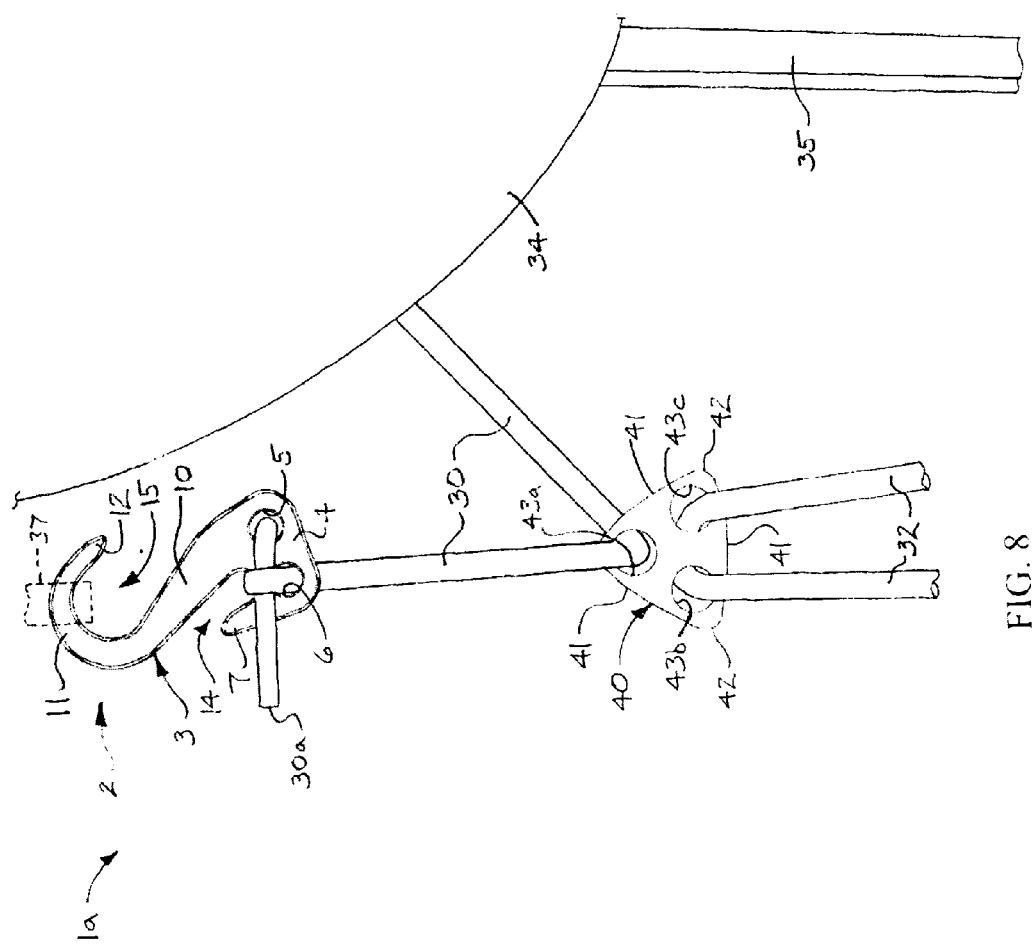
FIG. 8 is a side view, partially in section, of an exemplary tie down system utilizing a device hook and a rope lock in securing a boat cover on a boat according to exemplary application of the tie down system.

Referring next to FIG. 8 of the drawings, exemplary application of a device hook 3 with a strap lock 40 in securing a boat cover 36 (FIG. 5) on a boat 34 in exemplary application of a tie down system 1a is shown. A first device hook 3 may be attached to a tie down strap 37 on the boat cover 36. A first end 30a of a first tie down strap 30 may initially be threaded through the first strap opening 43a in the strap lock 40 and then through the secondary hook opening 6 and the primary hook opening 5, respectively, in the hook base 4 of the first device hook 3. The second end (not illustrated) of the first tie down strap 30 may be likewise attached to a second device hook 3a (not illustrated in FIG. 8) which engages a boat cover strap 37 on the boat cover 36. A second tie down strap 32 may be threaded through the second strap opening 43b and the third strap opening 43c, respectively, in the strap lock 40. A second pair of the first device hook 3 and the second device hook 3a (not illustrated in FIG. 8) may be attached to the respective ends of the second tie down strap 32. The first device hook 3 and the second device hook 3a on the second tie down strap 32 may be engaged with the boat trailer 35 to tension the first tie down strap 30 and the second tie down strap 32 and anchor or secure the boat cover 36 on the boat 34.

Figures 9, 10, 11:
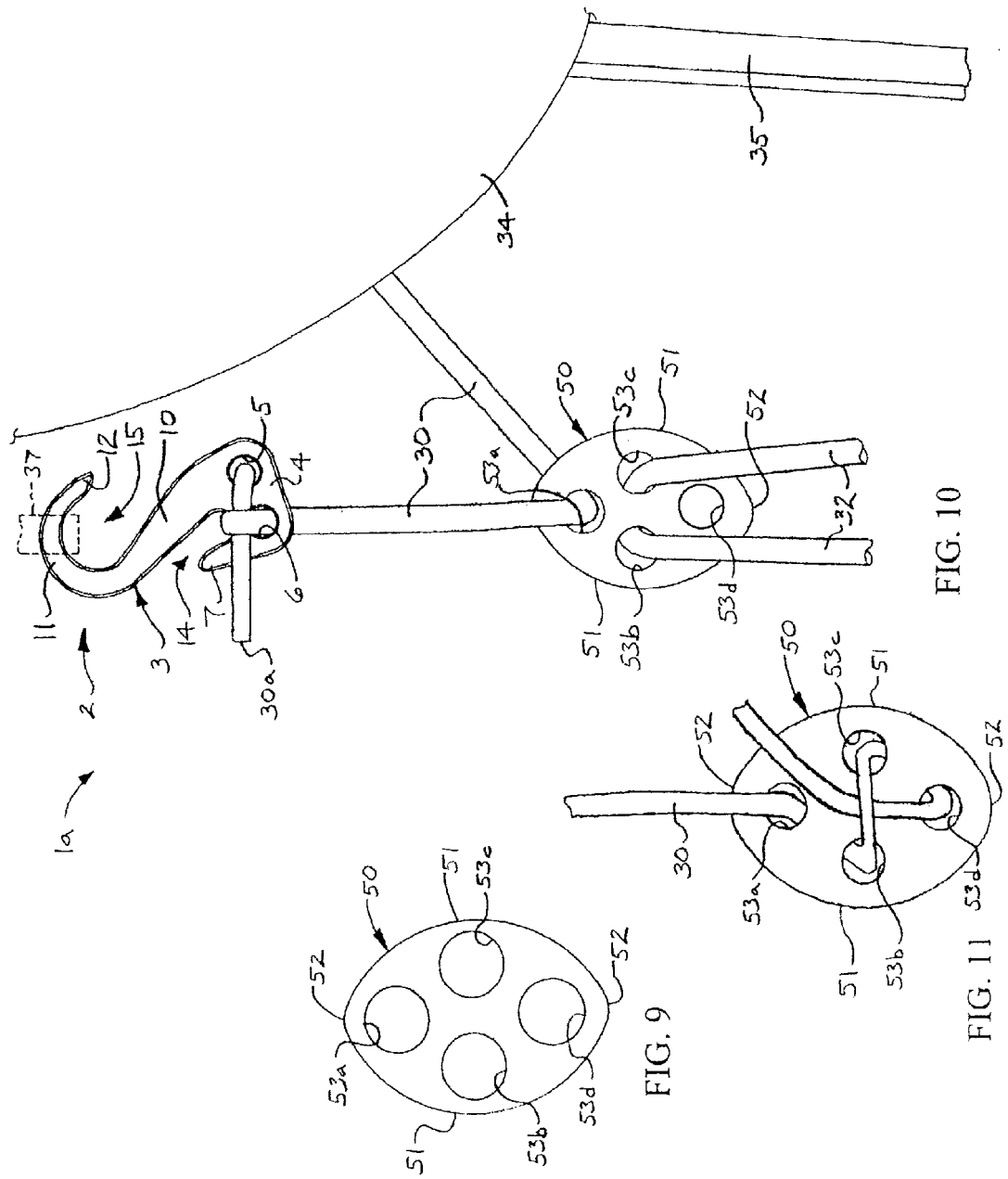
FIG. 9 is a front view of an alternative exemplary rope lock element of an illustrative embodiment of the tie down system.
FIG. 10 is a side view, partially in section, of an exemplary tie down system utilizing a device hook and a rope lock illustrated in FIG. 9 in securing a boat cover on a boat according to exemplary application of the tie down system.
FIG. 11 is a front view of the exemplary rope lock illustrated in FIG. 9, more particularly illustrating an alternative threading configuration of a tie down strap through the strap openings of the rope lock.

Referring next to FIGS. 9-11 of the drawings, an alternative exemplary strap lock 50 includes a pair of curved strap lock sides 51 and a pair of curved strap lock ends 52 terminating and extending between the strap lock sides 51. First, second, third and fourth strap lock openings 53a-53d, respectively, may extend through the strap lock 50 at the respective strap lock sides 51 and strap lock ends 52. As illustrated in FIG. 10, exemplary application of the strap lock 50 may be as was heretofore described with respect to the strap lock 40 in FIG. 8. Accordingly, the first end 30a of a first tie down strap 30 may initially be threaded through the first strap opening 53a in the strap lock 50 and then through the secondary hook opening 6 and the primary hook opening 5, respectively, in the hook base 4 of the first device hook 3. The second end (not illustrated) of the first tie down strap 30 may be likewise attached to a second device hook 3a (not illustrated in FIG. 10) which engages a boat cover strap 37 on the boat cover 36. A second tie down strap 32 may be threaded through the second strap opening 53b and the third strap opening 53c, respectively, in the strap lock 50. A second pair of the first device hook 3 and the second device hook 3a (not illustrated in FIG. 10) may be attached to the respective ends of the second tie down strap 32. The first device hook 3 and the second device hook 3a on the second tie down strap 32 may be engaged with the boat trailer 35 to tension the first tie down strap 30 and the second tie down strap 32 and anchor or secure the boat cover 36 on the boat 34. An alternative threading configuration of a tie down strap 30 through the strap openings 53a-53d of the rope lock 50 is shown in FIG. 11.

While illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A tie down system, comprising:
 a first device hook;
 a second device hook;
 each device hook including:
  a hook base;
  at least one primary hook opening in the hook base, wherein the at least one primary hook opening comprises a primary hook opening and a secondary hook opening and a tie down strap extends through the secondary hook opening, the hook slot and the primary hook opening, respectively;
  a generally elongated hook shaft extending from the hook base;
  a curved hook finger extending from the hook shaft;
  a hook opening formed by the hook shaft and the hook finger;
  a hook base extension extending from the hook base in generally adjacent, spaced-apart relationship to the hook shaft; and
  a hook slot of fixed size or volume between the hook shaft and the hook base extension, the hook slot on a side of the hook shaft opposite the hook opening; and
 the tie down strap terminating at a first strap end loop and a second strap end loop,
 the first strap end loop disposed to extend through the at least one primary hook opening in the hook base of the first device hook,
 the second strap end loop disposed to extend through the at least one primary hook opening in the hook base of the second device hook; and
 a strap lock defined by a pair of curved strap lock sides and a pair of curved strap lock ends, the strap lock ends terminating and extending between the strap lock sides;
 a first strap lock opening extending through the strap lock at a first one of the pair of strap lock ends;
 a second strap lock opening extending through the strap lock at a first one of the pair of strap lock sides;
 a third strap lock opening extending through the strap lock at a second one of the pair of strap lock sides;
 a fourth strap lock opening extending through the strap lock at a second one of the pair of strap lock ends, the tie down strap disposed to extend through at least one of the first strap lock opening, the second strap lock opening, the third strap lock opening and the fourth strap lock opening of the strap lock.

2. The tie down system of claim 1, wherein the strap lock is generally oval shaped.

3. The tie down system of claim 1, wherein the first tie down strap extends through the first strap lock opening.

4. The tie down system of claim 1, further comprising a second tie down strap extending through the second strap lock opening and the third strap lock opening.

5. The tie down system of claim 4, wherein the first end of the first tie down strap is configured to join with a boat cover.

6. The tie down system of claim 5, wherein the second end of the first tie down strap is configured to join with a boat trailer.

7. The tie down system of claim 6, wherein the first tie down strap and the second tie down strap are generally elongated and flexible.

8. A tie down system, comprising:
a first device hook;
a second device hook;
each device hook including:
  a hook base;
  at least one primary hook opening in the hook base, wherein the at least one primary hook opening comprises a primary hook opening and a secondary hook opening and the tie down strap extends through the secondary hook opening, the hook slot and the primary hook opening, respectively;
  a generally elongated hook shaft extending from the hook base;
  a curved hook finger extending from the hook shaft;
  a hook opening formed by the hook shaft and the hook finger;
  a hook base extension extending from the hook base in generally adjacent, spaced-apart relationship to the hook shaft; and
  a hook slot of fixed size or volume between the hook shaft and the hook base extension, the hook slot on a side of the hook shaft opposite the hook opening; and
a tie down strap, the tie down strap terminating at a first strap end loop and a second strap end loop; and
a generally oval shaped strap lock defined by a pair of curved strap lock sides and a pair of curved strap lock ends terminating and extending between the strap lock sides;
a first strap lock opening extending through the strap lock at a first one of the pair of strap lock ends;
a second strap lock opening extending through the strap lock at a first one of the pair of strap lock sides;
a third strap lock opening extending through the strap lock at a second one of the pair of strap lock sides;
a fourth strap lock opening extending through the strap lock at a second one of the pair of strap lock ends;
a first tie down strap having a first strap end loop and a second strap end loop, the first strap end loop of the first tie down strap configured to be threaded through the first strap opening in the strap lock and disposed to extend through the at least one primary hook opening in the hook base of the first device hook; and
a second tie down strap, the second tie down strap configured to be threaded through the second strap opening and the third strap opening, respectively, in the strap lock and disposed to extend through the at least one primary hook opening in the hook base of the second device hook.

9. The tie down system of claim 8, wherein the first end of the first tie down strap is configured to join with a boat cover.

10. The tie down system of claim 8, wherein the second end of the first tie down strap is configured to join with a boat trailer.

11. The tie down system of claim 8, wherein the first tie down strap and the second tie down strap are generally elongated and flexible.

* * * * *